(12) United States Patent
Nagurny et al.

(10) Patent No.: US 8,540,012 B2
(45) Date of Patent: Sep. 24, 2013

(54) HEAT EXCHANGER

(75) Inventors: Nicholas J. Nagurny, Manassas, VA (US); Natalie B. Levings, North Richland Hills, TX (US); Derek M. Beckner, Manassas Park, VA (US); Michael R. Eller, New Orleans, LA (US); Patrick D. Grandelli, Kailua, HI (US); Joe Van Ryzin, Kailua, HI (US); Eliot Goldstein, Fairfax, VA (US); Randy J. Brown, Slidell, LA (US); Leslie D. Kramer, Manassas, VA (US); Robert J. Howard, Walkersville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 961 days.

(21) Appl. No.: 12/484,542

(22) Filed: Jun. 15, 2009

(65) Prior Publication Data

US 2009/0308582 A1 Dec. 17, 2009

Related U.S. Application Data

(60) Provisional application No. 61/061,206, filed on Jun. 13, 2008, provisional application No. 61/144,597, filed on Jan. 14, 2009.

(51) Int. Cl.
*F28D 9/00* (2006.01)

(52) U.S. Cl.
USPC .................. 165/165; 29/890.049; 29/890.054

(58) Field of Classification Search
USPC ... 165/166, 167, 181; 228/112.1; 29/890.04, 29/890.046, 890.049, 890.054
See application file for complete search history.

(56) References Cited

U.S. PATENT DOCUMENTS

| | | | |
|---|---|---|---|
| 2,347,957 | A | 5/1944 | McCullough |
| 3,460,611 | A | 8/1969 | Folsom et al. |
| 3,595,310 | A | 7/1971 | Burne et al. |
| 3,805,515 | A | 4/1974 | Zener |
| 4,055,145 | A | 10/1977 | Mager et al. |
| 4,149,591 | A | 4/1979 | Albertsen |
| 4,253,516 | A | 3/1981 | Giardina |
| 4,350,014 | A | 9/1982 | Sanchez et al. |

(Continued)

FOREIGN PATENT DOCUMENTS

| | | |
|---|---|---|
| DE | 102007021420 A1 | 11/2008 |
| EP | 0174554 A1 | 3/1986 |
| FR | 2510729 A1 | 2/1983 |
| GB | 2424265 A | 9/2006 |

OTHER PUBLICATIONS

Vassoille, Bruno, "PCT Application No. PCT/US2010/050711 Written Opinion of the International Preliminary Examining Authority Nov. 18, 2011", , Publisher: PCT, Published in: PCT.

(Continued)

*Primary Examiner* — Teresa Walberg
(74) *Attorney, Agent, or Firm* — Kaplan Breyer Schwarz & Ottesen, LLP (57) ABSTRACT

A heat exchanger and a method for fabricating the heat exchanger are disclosed. The heat exchanger comprises a heat exchanger core that is formed from a plurality of stacked aluminum panels that are joined together via friction stir welding. Each panel in the core is formed from at least two aluminum extrusions that are joined to one another via friction stir welding.

29 Claims, 6 Drawing Sheets (56) References Cited

U.S. PATENT DOCUMENTS

| | | | |
|---|---|---|---|
| 4,592,416 A | 6/1986 | Mattison et al. | |
| 4,688,631 A * | 8/1987 | Peze et al. | 165/166 |
| 4,693,304 A | 9/1987 | Volland | |
| 4,738,309 A | 4/1988 | Schilling | |
| 4,941,530 A | 7/1990 | Crowe | |
| 5,289,870 A | 3/1994 | Dierbeck | |
| 5,452,758 A | 9/1995 | Mauterer | |
| 5,499,674 A | 3/1996 | Bartz et al. | |
| 5,590,707 A | 1/1997 | Mauterer | |
| 6,035,928 A * | 3/2000 | Ruppel et al. | 165/153 |
| 6,173,493 B1 | 1/2001 | Dierbeck | |
| 6,637,109 B2 * | 10/2003 | Nyqvist | 29/890.03 |
| 7,328,578 B1 | 2/2008 | Saucedo | |
| 2005/0061485 A1 | 3/2005 | Hirafuji et al. | |
| 2009/0229804 A1 | 9/2009 | Zebuhr | |
| 2009/0294110 A1 | 12/2009 | Foust | |

OTHER PUBLICATIONS

Yang et al., "Forced Heat Convection of Wavy Fin Channel", "Journal of Thermal Science and Technology", 2008, pp. 342-354, vol. 3, No. 2.

Stone, K.M., "Review of Literature on Heat Transfer Enchancement in Compact Heat Exchangers", "ACRC TR-105", Aug. 1996, Publisher: Air Conditioning and Refrigeration Center University of Illinois.

Vassoille, Bruno, "PCT Application No. PCT/2010/050711 International Search Report Jul. 1, 2011", , Publisher: PCT, Published in: PCT.

Vassoille, Bruno, "PCT Application No. PCT/US2010/050711 International Preliminary Report on Patentability Jan. 27, 2012"Publisher: PCT, Published in: PCT.

* cited by examiner

HEAT EXCHANGER

CROSS-REFERENCE TO RELATED APPLICATIONS

This case claims priority to: U.S. Provisional Patent Application Ser. No. 61/061,206, filed Jun. 13, 2008 and U.S. Provisional Patent Application Ser. No. 61/144,597, filed Jan. 14, 2009; each of which is incorporated by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to ocean thermal energy conversion systems in general, and, more particularly, to a heat exchanger for use in such systems.

BACKGROUND OF THE INVENTION

The Earth's oceans are continually heated by the sun and cover nearly 70% of the Earth's surface. The temperature different between deep and shallow waters contains a vast amount of solar energy that can potentially be harnessed for human use. In fact, it is estimated that the thermal energy contained in the temperature difference between the warm ocean surface waters and deep cold waters within ±10° of the Equator represents a 3 tera-watt ($3 \times 10^{12}$ W) resource.

The total energy available is one or two orders of magnitude higher than other ocean-energy options such as wave power, but the small magnitude of the temperature difference makes energy extraction comparatively difficult and expensive, due to low thermal efficiency.

Ocean thermal energy conversion ("OTEC") is a method for generating electricity which uses the temperature difference that exists between deep and shallow waters to run a heat engine. A heat engine is a thermodynamic device placed between a high temperature reservoir and a low temperature reservoir. As heat flows from one reservoir to the other, the engine converts some of the heat to work. This principle is used in steam turbines and internal combustion engines. Rather than using heat energy from the burning of fuel, OTEC power draws on temperature differences caused by the sun's warming of the ocean surface.

One heat cycle suitable for OTEC is the Rankine cycle, which uses a low-pressure turbine. Systems may be either closed-cycle or open-cycle. Closed-cycle systems use a fluid with a low boiling point, such as ammonia, to rotate the turbine to generate electricity. Warm surface seawater is pumped through a heat exchanger where the low-boiling-point fluid is vaporized. The expanding vapor turns the turbo-generator. Then, cold, deep seawater—pumped through a second heat exchanger—condenses the vapor back into a liquid, which is then recycled through the system. Open-cycle engines use the water heat source as the working fluid.

As with any heat engine, the greatest efficiency and power is produced with the largest temperature difference. This temperature difference generally increases with decreasing latitude (i.e., near the equator, in the tropics). But evaporation prevents the surface temperature from exceeding 27° C. Also, the subsurface water rarely falls below 5° C. Historically, the main technical challenge of OTEC was to generate significant amounts of power, efficiently, from this very small temperature ratio. But changes in the efficiency of modern heat exchanger designs enables performance approaching the theoretical maximum efficiency.

OTEC systems have been shown to be technically viable, but the high capital cost of these systems has thwarted commercialization. Heat exchangers are the second largest contributor to OTEC plant capital cost (the largest is the cost of the offshore moored vessel or platform). The optimization of the enormous heat exchangers that are required for an OTEC plant is therefore of great importance and can have a major impact on the economic viability of OTEC technology.

There are many existing heat-exchanger designs that can be considered for use in an OTEC system. But as the following discussion shows, there are, as a practical matter, no good choices.

Conventional "shell and tube" heat exchangers are widely available for marine use. But the overall heat transfer coefficient, U, that is associated with reasonable pressure drops for OTEC is typically below 2000 W/m²K. This drives the size and cost for this type of heat exchanger too high for economic consideration.

Compact heat exchangers/plate-frame designs, which comprise many narrowly separated plate pairs, are extensively used in the chemical and pharmaceutical industries. The U value for plate-frame designs may approach 2300-2500 W/m²K. In order to achieve this level of heat transfer in an OTEC system, however, high pumping power is necessary to force seawater through the heat exchanger to overcome a pressure drop that can exceed 5 psi (3.5 m head loss). Further, the upper value of the heat transfer coefficient is restricted by the use of materials such as high-alloy steel or titanium (which have relatively poor thermal conductivity but mitigate the effects caused by exposure to corrosive materials, such as chlorides, etc.), by the minimum plate thickness needed for stamped plate design, and by the relatively low water flow velocities required to maintain an acceptable pressure drop.

OTEC-optimized tube designs also fall into the compact heat exchanger category. These include Vertical Fluted Tube and Folded Tube heat exchangers. Both have somewhat higher U values than plate-frame designs: typically in the range of about 2700-3400 W/m²K. But a substantial pressure drop and potential for crevice corrosion in regions of stagnant flow are a concern for the optimized tube designs.

Brazed aluminum-fin heat exchangers are used throughout the cryogenics industry. These heat exchangers see large scale marine use in Liquid Natural Gas (LNG) re-gasification facilities. Brazed aluminum-fin heat exchangers were developed and tested for OTEC use in the 1980s at Argonne National Labs (ANL). See, U.S. Pat. No. 4,276,927 ("Plate type heat exchanger") and U.S. Pat. No. 4,478,277 ("Heat exchanger having uniform surface temperature and improved structural strength").

One of the main technical challenges addressed in these patents was the segregation of braze joints away from seawater passages to reduce the potential for corrosion. An optimized folded-fin design was used to minimize boundary layer resistance in boiling/condensing working fluid.

Through the mid 80's to the early 90s, various aluminum heat exchanger modules and alloys were tested in an actual OTEC environment. These instrumented and remotely-monitored tests correlated heat transfer performance and seawater chemical and physical properties with corrosion in the heat exchangers. As a result of this extended testing, it was concluded that several relatively inexpensive aluminum alloys should survive well in an OTEC application.

The form factor for the heat exchangers being tested was mostly shell and tube type. It was concluded that fabrication, out of aluminum, of shell-and-tube heat exchangers of sufficient surface area would be prohibitively expensive. "Roll bond" heat exchanger panels were proposed as an alternative, which provide the larger surface areas required for OTEC applications at roughly twenty percent the cost of equivalent shell and tube units.

In 1989, roll-bond panels were inserted into some the heat exchangers that were being tested in the OTEC environment. This testing led to the development of roll-bond type heat exchanger panels that were actually installed in a 50 kW plant built in 1996. During the first year of testing, serious ammonia leaks were experienced due to corrosion. The corrosion was due to electrolysis, which was caused by the spacer material between the aluminum panels.

The heat exchangers were re-manufactured and, after some difficulties with brazing associated with the inlets/outlets, the plant was reassembled and additional performance and corrosion data were collected. Based on these results, additional roll-bond modules were fabricated and tested in a simulated OTEC environment at a power plant in England.

By the mid-1990s, government funding of OTEC had concluded. Remaining hurdles for compact aluminum heat exchangers at that time included concerns over the placement of brazed sections within a heat exchanger core.

With today's growing need for energy, using a renewable constant source is a desirable solution. As a consequence, there is a renewed interest in OTEC power plants. But development of an OTEC heat exchanger that accommodates high flow rates while minimizing pumping parasitic losses and offering long life in the ocean environment remains elusive.

SUMMARY OF THE INVENTION

The present invention provides a heat exchanger without some of the costs and disadvantages of the prior art. Compared to the prior art, heat exchangers in accordance with the present invention are characterized by:
  i. lower pressure drop; or
  ii. lower cost; or
  iii. higher reliability; or
  iv. higher efficiency; or
  v. longer service time; or
  vi. any combination of i, ii, iii, iv, and v.

Embodiments of the present invention are particularly well-suited for use in OTEC systems; however, embodiments in accordance with the present invention are also suited for use in other heat exchanger applications.

The illustrative embodiment of the present invention is a modular system of components that mate to form a complete heat exchanger core consisting of only a single material. The individual components that compose the heat exchanger are joined together using friction-stir welding; therefore, the introduction of dissimilar materials at welded joints is avoided. As a result, the heat exchanger core is less susceptible to galvanic corrosion. Further, primary and secondary fluids are introduced to the heat exchanger core through manifolds that consist of the same material. The manifolds are also joined to the heat exchanger using friction-stir welding.

Embodiments of the present invention comprise a plurality of first conduits that carry primary fluid (i.e., a working fluid, such as ammonia, etc.) and a plurality of second conduits that carry a secondary fluid (e.g., sea water). The first and second conduits are substantially straight so that the pressure drop through them is very low. In addition, the first and second conduits are arranged parallel to one another so that their interaction length is very high. Heat transfer efficiency is proportional to fluid interaction length; therefore, a heat exchanger with greater interaction length can more effectively transfer heat between two fluids. Still further, the low pressure drop through straight conduits reduces the energy necessary to pump primary fluid and/or secondary fluid through their respective conduits.

The heat exchangers disclosed herein make use of friction-stir welding for the following purposes, among any others:
  Joining planks to form panels that each contain a first plurality of internal channels for conveying a first fluid;
  Joining panels to form channels for conveying a second fluid;
  Joining the sides of stacked aluminum planks and/or panels together;
  Sealing channels in a stack of aluminum plates so that the flow of a first fluid through the heat exchanger is isolated from the flow of a second fluid through the heat exchanger; and
  Joining channels and manifolds that provide fluid to the channels.

An embodiment of the present invention comprises: a heat exchanger comprising a first panel consisting of a first material that is substantially thermally conductive, wherein the first panel comprises; a first plank comprising a first conduit for conveying a first fluid, wherein the first plank consists of the first material; and a second plank comprising a second conduit for conveying the first fluid, wherein the second plank consists of the first material; wherein the first plank and the second plank are fixedly joined with a substantially galvanic corrosion-free joint, and wherein the first plank and the second plank collectively define a third conduit for conveying a second fluid.

DETAILED DESCRIPTION

Figure 1:
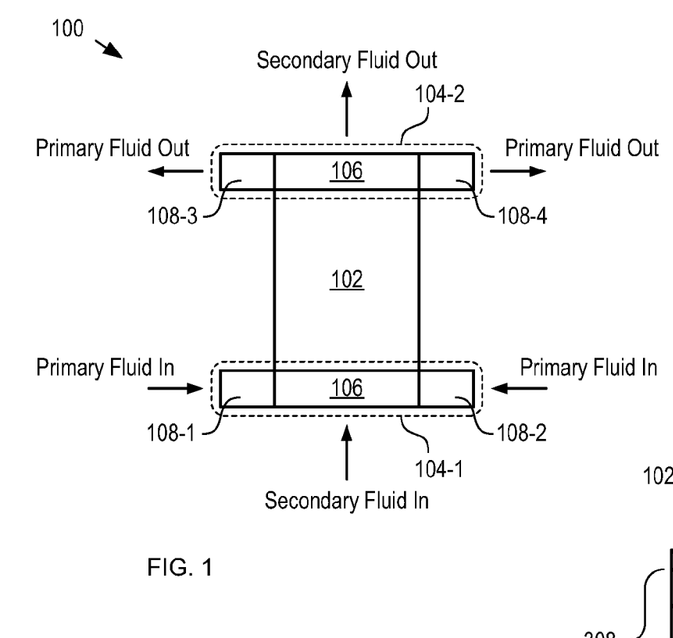
FIG. 1 depicts a schematic drawing of a heat exchanger in accordance with an illustrative embodiment of the present invention.

FIG. 1 depicts a schematic drawing of a heat exchanger in accordance with an illustrative embodiment of the present invention. Heat exchanger 100 comprises heat exchanger core 102 and manifolds 104-1 and 104-2.

Heat exchanger core 102 (hereinafter referred to as "core 102") is a modular system of extruded aluminum planks that are joined together to form a complete core. Core 102 comprises channels through which primary fluid and secondary fluid can flow. As they are conveyed through core 102, heat is transferred between the two fluids. Core 102 is described in more detail below and with respect to FIGS. 3-6.

Manifolds 104-1 and 104-2 (referred to, collectively, as manifolds 104) provide primary fluid and secondary fluids to the channels of core 102. Each of manifolds 104 comprises ports 108 and distributor 106. Manifolds 104-1 and 104-2 are described in detail below and with respect to FIGS. 6A-C.

Although the illustrative embodiment comprises components that consist of aluminum, it will be clear to one skilled in the art, after reading this specification, how to specify, make, and use alternative embodiments of the present invention that comprise components that consist of another material that is substantially resistant to corrosion, particularly in an ocean environment. The material used for core 102 and manifolds 104 should not exhibit excessive corrosion in an ocean environment over the lifetime of the heat exchanger. In addition, this material used for core 102 should be substantially thermally conductive. Materials suitable for use in core 102 and manifolds 104 include, without limitation, aluminum, aluminum alloys, ceramics, steel alloys, titanium, titanium alloys, and the like.

Figure 2A:
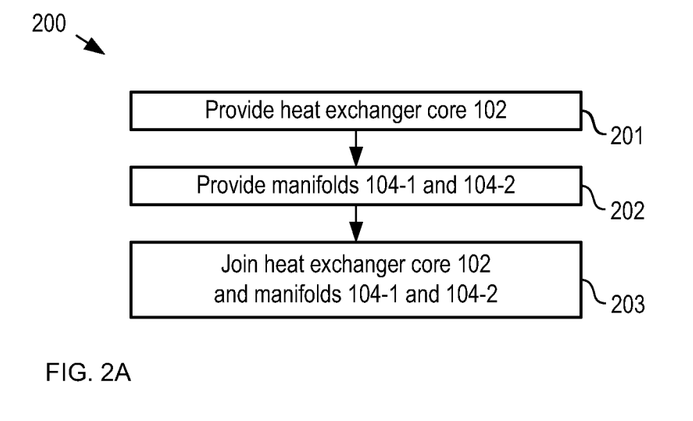
FIG. 2A depicts a method comprising operations suitable for formation of a heat exchanger in accordance with the illustrative embodiment of the present invention.

FIG. 2A depicts a method comprising operations suitable for formation of a heat exchanger in accordance with the illustrative embodiment of the present invention. Method 200 begins with operation 201, wherein heater core 102 is provided. Method 200 is described with continuing reference to FIG. 1 and reference to FIGS. 3-6.

Figure 3:
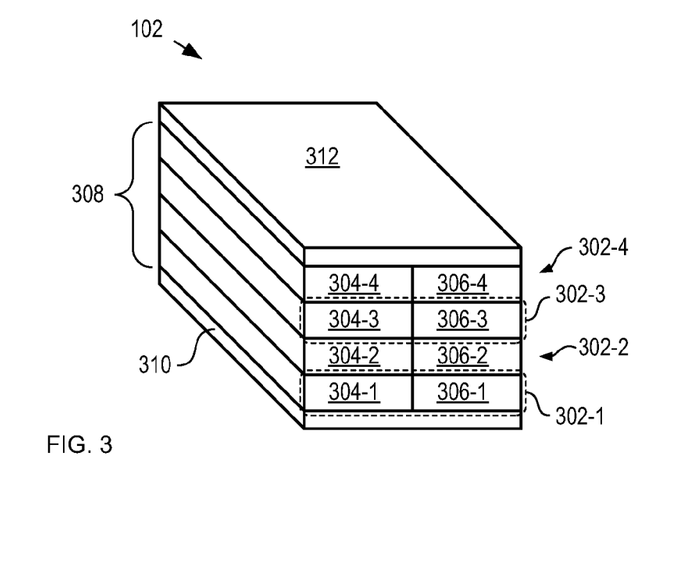
FIG. 3 depicts a heat exchanger core in accordance with the illustrative embodiment of the present invention.

Core 102 is a modular system of extruded aluminum planks that nest together to form a plurality of channels (i.e., primary channels) for conveying a primary fluid, such as ammonia. Each plank includes a plurality of internal channels (i.e., secondary channels) for conveying a secondary fluid. For OTEC applications, this secondary fluid is typically seawater. In the illustrative embodiment, the primary channels and secondary channels are straight conduits that are parallel to one another. This affords several advantages to embodiments of the present invention. First, straight channels minimize the pressure drop that develops through core 102. Second, the parallel arrangement of the channels maximizes the interaction length between the primary and secondary channels. This maximizes the heat transfer between the primary and secondary fluids. Third, straight channels incur less corrosion damage due to bio fouling from slime that can build up at discontinuities of non-straight channels.

Pressure drop through a heat exchanger is largely the result of minor fitting losses and frictional losses arising from turbulence in the flow passages. The heat exchangers disclosed herein are based on a parallel-/counter-flow heat exchanger geometry. In this geometry, both primary and secondary fluids progress straight through the heat exchanger, thereby encountering very low pressure losses. Due to the simple fluid path geometries, no unnecessary pressure losses are encountered in the heat exchanger core. Necessary pressure drops across the heat exchanger core are a result of the turbulence created to aid heat transfer. Prior-art heat exchanger geometries, such as plate and frame, involve fluid re-direction where losses become restrictive to the fluid flow and do not substantially benefit heat transfer.

Operating costs for OTEC heat exchangers are dominated by the power draw needed to run high-flow seawater pumps. Pumping power in megawatts (MW) is proportional to flow rate multiplied by hydraulic head loss through the heat exchanger. For a 10 MW pilot plant OTEC facility, the power requirement drops from 4.44 for a plate-frame heat exchanger to 1.33 MW for heat exchangers in accordance with the present invention.

The major improvement in energy generation efficiency comes from having to devote less power to pumping seawater through heat exchangers of the present invention. In the case of an OTEC plant, the efficiency improvement is seen as a higher ratio of net power generation/gross power, where: Net Power=Gross Power−(Heat exchanger pumping+other losses). These other losses include: cold water pipe seawater pumping, warm seawater pumping, ammonia pumping and power conversion/transmission to shore. For a 10 MW pilot plant, these other losses are typically on the order of 3.5 MW.

For example, according to models, a typical prior-art OTEC plant that generates 10 MW of power, but is based on plate-frame heat exchangers, requires 17.9 MW gross power. This represents a Net/Gross ratio of 55.9%.

In comparison, modeling data shows that a 10 MW OTEC plant, based on heat exchangers of the present invention requires only 14.8 MW gross power–a Net/Gross ratio of 67.6%, an efficiency improvement of nearly 12%.

FIG. 3 depicts a heat exchanger core in accordance with the illustrative embodiment of the present invention. Core 102 comprises panel stack 308, bottom plate 310, and top plate 312.

Figure 2B:
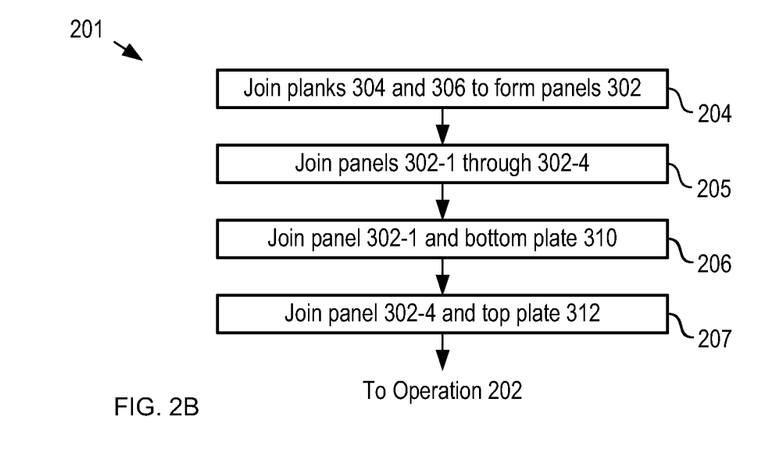
FIG. 2B depicts sub-operations suitable for providing a heat exchanger core such as described in operation 201 of method 200.

FIG. 2B depicts sub-operations suitable for providing a heat exchanger core such as described in operation 201 of method 200.

At sub-operation 204, each of planks 304-1 through 304-4 (referred to, collectively, as planks 304), is joined with a corresponding one of planks 306-1 through 304-6 (referred to, collectively, as planks 306) to form panels 302-1 through 302-4 (referred to, collectively, as panels 302). Specifically: plank 304-1 is joined with plank 306-1 to form panel 302-1; plank 304-2 is joined with plank 306-2 to form panel 302-2; plank 304-3 is joined with plank 306-3 to form panel 302-3; and plank 304-4 is joined with plank 306-4 to form panel 302-4.

Figure 4A:
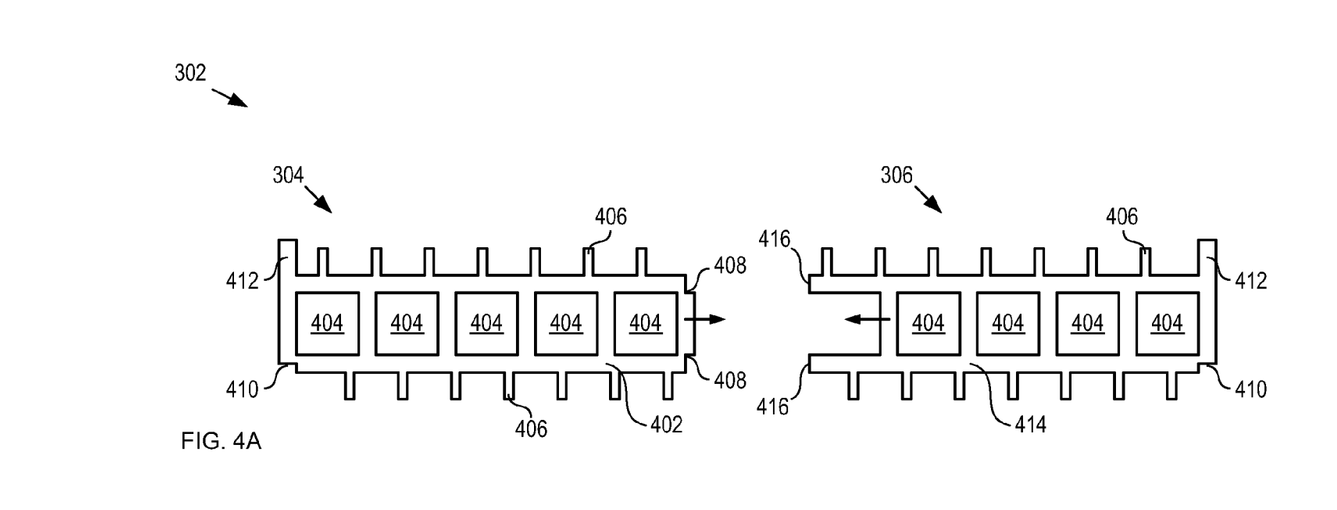
FIG. 4A depicts a cross-sectional view of an unassembled panel in accordance with the illustrative embodiment of the present invention.

FIG. 4A depicts a cross-sectional view of an unassembled panel in accordance with the illustrative embodiment of the present invention.

Plank 304 comprises body 402, channels 404, fins 406, shoulders 408, shoulder 410, and wall 412. Plank 304 is representative of each of planks 304-1 through 304-4.

Body 402 consists of extruded aluminum, into which a plurality of channels 404 is formed. Channels 404 are straight conduits that are suitable for conveying secondary fluid through core 102. It should be noted that the number and size of channels 404 included in plank 304 is a matter of design and that plank 302 can include channels 404 of any number or size that is practical.

Figure 6A:
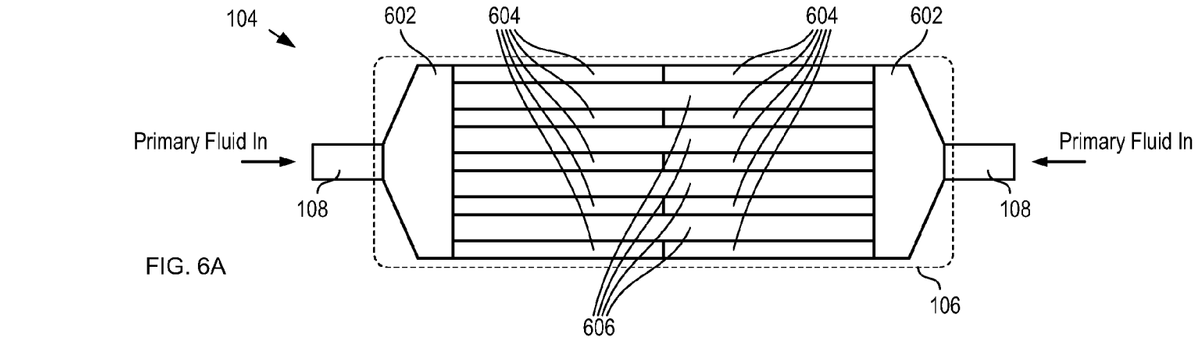
FIG. 6A depicts a side view of a manifold in accordance with the illustrative embodiment of the present invention.

Fins 406 are narrow extensions that project perpendicularly from the top and bottom surfaces of body 402. Fins 406 increase the surface area of body 402 that is in contact with primary fluid during operation, as described below and with respect to FIG. 6.

Shoulders 408 are receivers for mating with shelves 416 of plank 306, as described below and with respect to FIG. 4B.

Shoulder 410 is a receiver for mating with wall 412 of an adjacent panel 302 or bottom plate 310.

Wall 412 is a projection from body 402 that forms a portion of a conduit for conveying primary fluid. Wall 412 also mates with a shoulder 410 of an adjacent element such as another panel 302 or top plate 312. The interaction between shoulders 410 and walls 412 is described below and with respect to FIG. 5.

Plank 306 comprises body 414, channels 404, fins 406, shoulder 410, wall 412, and shelves 416. Plank 306 is representative of each of planks 306-1 through 306-4.

Body 414 consists of extruded aluminum, into which a plurality of channels 404 is formed. In similar fashion to plank 304, a plurality of fins 406 project from the top and bottom surfaces of body 414.

As noted above, vis-à-vis plank 404, the number and size of channels 404 included in plank 306 is a matter of design and that plank 306 can include channels 404 of any number or size that is practical.

Shelves 416 are projections from body 414 that abut shoulders 408 of plank 304 to form a channel 404. Further, shoulders 416 mate with shoulders 408 of plank 304, as described below and with respect to FIG. 4B.

Figure 4B:
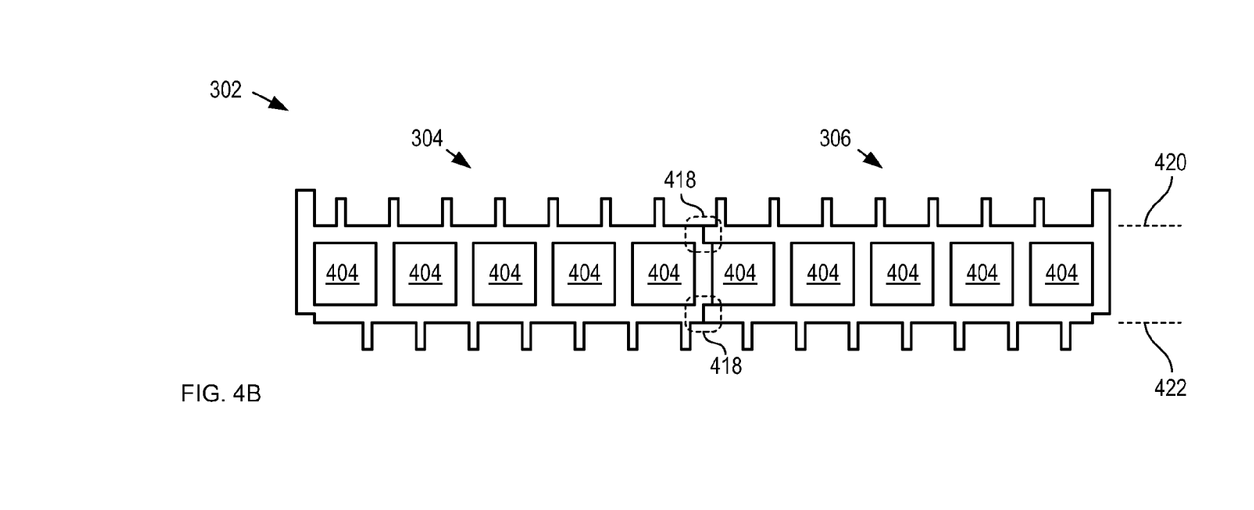
FIG. 4B depicts a cross-sectional view of an assembled panel in accordance with the illustrative embodiment of the present invention.
Figure 4C:
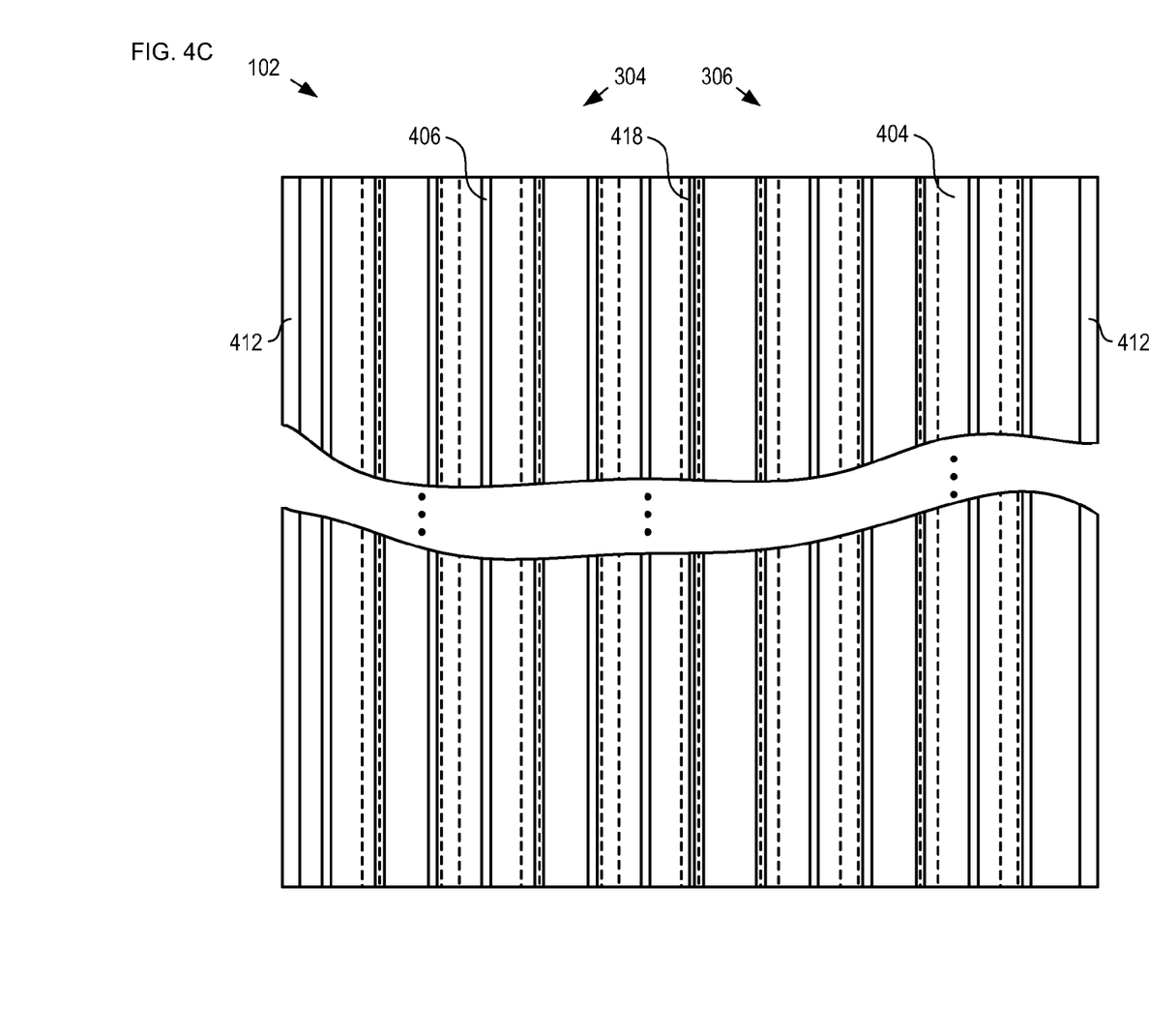
FIG. 4C depicts a top view of an assembled panel in accordance with the illustrative embodiment of the present invention.

FIGS. 4B and 4C depict cross-sectional and top views, respectively, of an assembled panel in accordance with the illustrative embodiment of the present invention. Panel 302 is representative of any of panels 302-1 through 302-4.

At sub-operation 204, each pair of planks 304 and 306 are physically mated to interlock shoulders 408 of plank 304 and shelves 416 of plank 306. Each mated shelf 416 and shoulder 408 collectively defines a weld line that facilitates the fixedly joining of planks 304 and 306 by means of friction-stir welding.

Once planks 304 and 306 are physically mated, friction-stir welding is used to fuse the weld lines defined by shoulders 408 and shelves 416 at joints 418.

It should be noted that additional panels designed for interposing and mating each of planks 304 and 306 can be included if a wider panel is desired.

In the illustrative embodiment, friction-stir welding is used to form substantially galvanic corrosion-free joints in core 102. Friction-stir welding was developed by the Welding Institute in 1991. Friction-stir welding employs a rotating probe, wherein a downward force is applied to the probe perpendicular to the weld surface to join similar metals or alloys together. The immense friction between the probe and materials causes material in the immediate vicinity of the probe to heat up to temperatures below its melting point. This softens the adjoining sections, but because the material remains in a solid state, its original material properties are retained. Movement of the probe along the weld line forces the softened material from the two pieces towards the trailing edge causing the adjacent regions to fuse, hence forming a weld.

As opposed to other common joining techniques, including other methods that produce galvanic corrosion-free joints, friction-stir welding has several performance advantages. In particular, the resultant weld is comprised of the same material as the joined sections. As a result, galvanic corrosion due to contact between dissimilar metals at the joint is reduced or eliminated. Furthermore, the resultant weld retains the material properties of the material of the joined sections.

Still further, production of the aluminum (or aluminum alloy) extrusions coupled with the use of the friction-stir welding technique permits the heat exchangers to be fabricated at a cost savings of 30% to 40% compared to prior-art heat exchangers.

Although the illustrative embodiment comprises elements that are joined using friction-stir welding, it will be clear to one skilled in the art, after reading this specification, how to specify, make, and use alternative embodiments wherein elements are joined by another technique that achieves a substantially galvanic corrosion-free joint. Joining methods suitable for use with the present invention include, without limitation, some types of fusion welding, the use of elastomeric or epoxy-based joint compounds, and the like. It will be understood, however, that typical fusion welded joints induce a larger heat affected zone that commonly exhibits reduced material strength, as compared to joints formed with friction-stir welding. It will also be understood elastomeric or epoxy-based materials typically have poor thermal conductivity; therefore, joints formed using these materials will exhibit poor thermal performance as compared to friction-stir welded joints.

At sub-operation 205, panels 302-1 through 302-4 are joined together using friction-stir welding.

Figure 5:
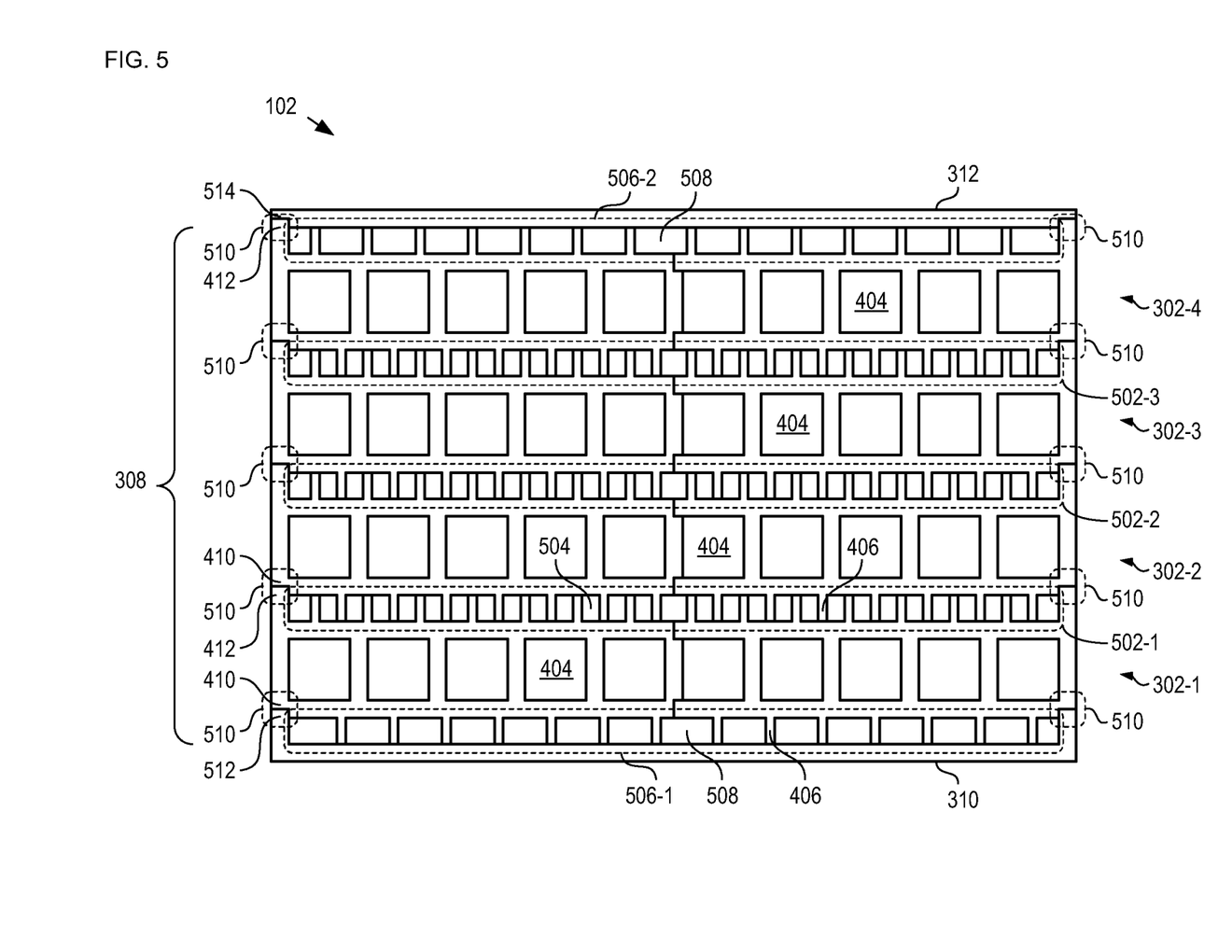
FIG. 5 depicts a cross-sectional view of details of a completed heat exchanger core in accordance with the illustrative embodiment of the present invention.

FIG. 5 depicts a cross-sectional view of details of a completed heat exchanger core in accordance with the illustrative embodiment of the present invention.

Panel 302-1 and panel 302-2 are joined by interlocking shoulders 410 of plank 302-2 and walls 412 of plank 302-1. Each mated wall 412 and shoulder 410 collectively defines a weld line that facilitates the joining of panels 302-1 and 302-2 using friction-stir welding. Once panels 302-1 and 302-2 are physically mated, shoulders 410 and walls 412 are welded using friction-stir welding to form joints 510.

Once they are joined together, panels 302-1 and 302-2 collectively define conduit 502-1. Conduit 502-1 comprises channels 504, formed by fins 406 that project from top surface 420 of panel 302-1 and the fins 406 that project from bottom surface 422 of panel 302-2.

In similar fashion, panel 302-2 and panel 302-3 are joined by interlocking shoulders 410 of plank 302-3 and walls 412 of plank 302-2. Each mated wall 412 and shoulder 410 collectively defines a weld line that facilitates the joining of panels 302-2 and 302-3 using friction-stir welding. Once panels 302-2 and 302-3 are physically mated, shoulders 410 and walls 412 are welded using friction-stir welding to form joints 510.

Joined panels 302-2 and 302-3 collectively define conduit 502-2, which comprises channels 504.

Finally, panel 302-3 and panel 302-4 are joined by interlocking shoulders 410 of plank 302-4 and walls 412 of plank 302-3. Each mated wall 412 and shoulder 410 collectively defines a weld line that facilitates the joining of panels 302-3 and 302-4 using friction-stir welding. Once panels 302-3 and 302-4 are physically mated, shoulders 410 and walls 412 are welded using friction-stir welding to form joints 510.

Joined panels 302-3 and 302-4 collectively define conduit 502-3, which also comprises channels 504.

Joined panels 302-1, 302-2, 302-3, and 302-4 collectively define panel stack 308. Although in the illustrative embodiment, panel stack 308 comprises four panels, it will be clear to one skilled in the art, after reading this specification, how to specify, make, and use heater cores that comprise any number of panels.

Although in the illustrative embodiment, fins 406 are the same height as conduits 502 and, therefore, completely separate each conduit 502 into distinct channels 504, it will be clear to one skilled in the art, after reading this specification, how to specify, make, and use alternative embodiments wherein fins 406 are shorter than the separation between adjacent panels. In such embodiments, conduit 502 acts as a single channel into which fins 406 only partially project. It should be noted that in some alternative embodiments of the present invention, fins 406 are not included and conduit 502-1 is simply a single channel. In embodiments that include fins 406, however, more efficient heat transfer between fluid in channels 404 and conduits 502 is enabled.

At sub-operation 206, panel stack 308 and bottom plate 310 are joined by joining panel 302-1 and bottom plate 310. Shoulders 410 of panel 302-1 and walls 512 of bottom plate 310 are physically mated and welded using friction-stir welding to form weld joints 510.

By virtue of the joining of panel 302-1 and bottom plate 310, conduit 506-1 comprising channels 508 is formed. Conduit 506-1 is analogous to conduit 502-1; however, channels 508 are generally wider than channels 504, since there are fewer fins 406 that project into conduit 506-1.

At sub-operation 207, panel stack 308 and top plate 312 are joined by joining panel 302-4 and top plate 312. Walls 412 of panel 302-4 and shoulders 514 of top plate 312 are physically mated and welded using friction-stir welding, thereby forming additional weld joints 510.

By virtue of the joining of panel 302-4 and top plate 312, conduit 506-2 comprising channels 508 is formed. Conduit 506-2 is also analogous to conduit 506-1.

Upon the completion of sub-operation 207, heat exchanger core 102 is fully formed.

At operation 202, manifolds 104-1 and 104-2 are provided.

FIG. 6A depicts a side view of a manifold in accordance with the illustrative embodiment of the present invention. Manifold 104 is representative of each of manifolds 104-1 and 104-2 and comprises distributor 106 and ports 108. Manifold 104 consists of the same material as core 102 to facilitate friction-stir welding. Manifold 104 comprises two substantially identical sides in order to mitigate deleterious effects, such as pressure drops or turbulence, which typically arise from transitioning fluid flow between a plurality of small conduits and a large conduit.

Figure 6B:
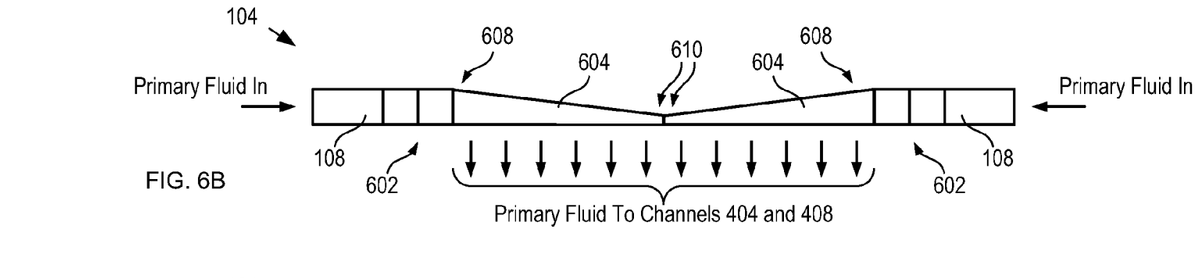
FIG. 6B depicts manifold 104 in operation as an inlet manifold.

FIG. 6B depicts manifold 104 in operation as an inlet manifold. During operation as an inlet manifold, distributor 106 receives primary fluid from ports 108 and distributes it into conduits 502-1 through 502-3 and conduits 506-1 and 506-2. Distributor 106 comprises region 602 which physically expands the flow of primary fluid in order to introduce it into conduits 604 with substantially uniform flow velocity. The number of conduits 604 is based on the combined number of conduits 502 and 506 in core 102. Conduits 604 are interposed by access ports 606, which enable access for secondary fluid to channels 404 and 408 of core 102. In some alternative embodiments, manifold 104 comprises a second plurality of conduits for fluidically coupling secondary fluid and channels 404 and 408.

It should be noted that conduits 604 are tapered from wide end 608 to narrow end 610. This tapering facilitates the flow of primary fluid through channels 404 and 408 with substantially uniform flow velocity.

Figure 6C:
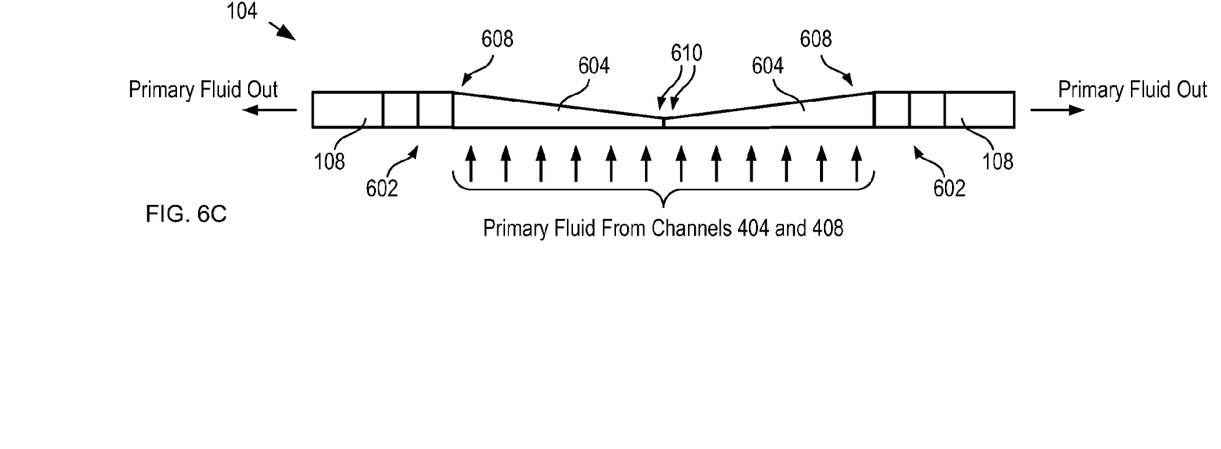
FIG. 6C depicts manifold 104 in operation as an outlet manifold.

FIG. 6C depicts manifold 104 in operation as an outlet manifold. During operation as an outlet manifold, conduits 604 receive primary fluid from channels 404 and 408 of core 102. Conduits 604 convey the received primary fluid to region 602, which redirects the flow from each conduit into port 108. As for inlet manifold operation, the tapering of conduits 604 facilitates conveying the primary fluid through manifold 104 with substantially uniform flow velocity.

At operation 203, core 102 is welded to each of manifolds 104-1 and 104-2 using friction-stir welding. Subsequent to operation 203, conduits 502 and 506 are sealed by conduits 604, while access ports 606 enable the flow of seawater through channels 404. As a result, primary fluid in channels 504 and 508 is fluidically isolated from secondary fluid in channels 404.

Although the illustrative embodiment comprises manifolds 104 that are made of the same material as core 102, it will be clear to one skilled in the art, after reading this specification, how to specify, make, and use alternative embodiments that comprises manifolds consisting of a different corrosion-resistant material (e.g., a fiberglass composite), which can be joined to core 102 with a substantially galvanic corrosion-free joint.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A heat exchanger comprising:
   a first plank comprising a first conduit for conveying a first fluid, wherein the first plank consists of a first material that is substantially thermally conductive; and
   a second plank comprising a second conduit for conveying the first fluid, wherein the second plank consists of the first material, wherein the first plank and second plank are mated such that they collectively define a first weld line;
   wherein the first plank and the second plank are fixedly joined along the first weld line via a first friction-stir welding joint, and wherein the first plank and the second plank collectively define a third conduit for conveying a second fluid, and further wherein the first friction-stir welding joint is operative as a barrier between a flow of the first fluid and a flow of the second fluid.

2. The heat exchanger of claim 1 wherein the first conduit comprises a first plurality of first channels, and wherein the second conduit comprises a second plurality of first channels, and wherein the third conduit comprises a first plurality of second channels.

3. The heat exchanger of claim 1 wherein the first material comprises aluminum.

4. The heat exchanger of claim 1 wherein the first material consists essentially of aluminum.

5. The heat exchanger of claim 1 wherein the first material consists of aluminum.

6. The heat exchanger of claim 1 wherein the first material consists of an aluminum alloy.

7. The heat exchanger of claim 1 wherein each of the first plank and the second plank is an extruded plank.

8. The heat exchanger of claim 1 wherein the first plank comprises a first feature, and wherein the second plank comprises a second feature, and further wherein the first feature receives the second feature such that the first feature and second feature collectively define the first weld line.

9. The heat exchanger of claim 1 further comprising:
   a third plank comprising a fourth conduit for conveying the first fluid, wherein the third plank consists of the first material; and
   a fourth plank comprising a fifth conduit for conveying the first fluid, wherein the fourth plank consists of the first material;
   wherein the third plank and the fourth plank are fixedly joined with a substantially galvanic corrosion-free joint, and wherein the third plank and the fourth plank collectively define a sixth conduit for conveying the second fluid, and further wherein at least one of the third plank and fourth plank is fixedly joined with at least one of the first plank and second plank with a substantially galvanic corrosion-free joint.

10. The heat exchanger of claim 9 further comprising a first manifold, wherein the first manifold provides the first fluid to the first conduit, second conduit, fourth conduit, and fifth conduit, and wherein the first manifold consists of the first material, and wherein the first manifold and at least one of the first plank, second plank, third plank, and fourth plank are joined with a second friction-stir welding joint.

11. The heat exchanger of claim 10 wherein the first manifold substantially equalizes the flow velocity of the first fluid through the first conduit, second conduit, fourth conduit, and fifth conduit.

12. The heat exchanger of claim 9 further comprising:
a first manifold, wherein the first manifold provides the first fluid to the first conduit and the second conduit; and
a second manifold, wherein the second manifold provides the first fluid to the fourth conduit and the fifth conduit;
wherein each of the first manifold and the second manifold consist of the first material;
wherein the first manifold, first plank, and second plank are joined with a second friction-stir welding joint; and
wherein the second manifold, third plank, and fourth plank are joined with a third friction-stir welding joint.

13. A heat exchanger comprising:
a first plank comprising a first plurality of first channels for conveying a first fluid, wherein the first plank consists of a first material that is substantially thermally conductive; and
a second plank comprising a second plurality of first channels for conveying the first fluid, wherein the second plank consists of the first material;
wherein the first plank and second plank are fixedly joined by friction-stir welding, and wherein the first plank and second plank collectively define a first conduit for conveying a second fluid, and wherein first plank and second plank enable thermal coupling between the first fluid and the second fluid.

14. The heat exchanger of claim 13 wherein the first plank comprises a first feature and the second plank comprises a second feature, and wherein the first feature and second feature engage and collectively define a first weld line, and further wherein a first friction-stir welding joint is formed along the first weld line.

15. The heat exchanger of claim 13 wherein the first plank comprises a first plurality of fins that project into the first conduit.

16. The heat exchanger of claim 15 wherein the first plurality of fins collectively define a first plurality of second channels for conveying the second fluid.

17. The heat exchanger of claim 15 wherein the second plank comprises a second plurality of fins that project into the first conduit.

18. The heat exchanger of claim 13 further comprising a manifold for providing the first fluid to the first plurality of first channels and the second plurality of first channels, wherein the manifold consists of the first material, and wherein the manifold and at least one of the first plank and second plank are fixedly joined by friction-stir welding.

19. The heat exchanger of claim 18 wherein the manifold substantially equalizes the flow velocity of the first fluid through each of the first plurality of first channels and each of the second plurality of first channels.

20. The heat exchanger of claim 13 wherein each of the first plank and the second plank is an extruded plank.

21. The heat exchanger of claim 13 wherein the first plank and second plank are joined by a plurality of friction-stir welding joints, and wherein each of the plurality of friction-stir welding joints is substantially crevice free.

22. A method of forming a heat exchanger comprising:
providing a first plank comprising a first plurality of first channels for conveying a first fluid, wherein the first plank consists of a first material that is substantially thermally conductive;
providing a second plank comprising a second plurality of first channels, wherein the second plank consists of the first material;
mating the first plank and a second plank such that they collectively define a first weld line; and
joining the first plank and the second plank along the first weld line via a first friction-stir welding joint, wherein the joined first plank and second plank collectively form at least a portion of a first conduit for conveying a second fluid.

23. The heat exchanger of claim 22 wherein the first friction-stir welding joint is formed such that it acts as a barrier between a flow of the first fluid and a flow of the second fluid.

24. The heat exchanger of claim 22 further comprising joining a first manifold and at least one of the first plank and the second plank with a second friction-stir welding joint, wherein the first manifold provides the first fluid to each of the first channels.

25. The heat exchanger of claim 24 further comprising providing the first manifold, wherein the first manifold consists of the first material.

26. The heat exchanger of claim 22, wherein the first plank is provided as an extruded plank.

27. The heat exchanger of claim 25 wherein the first manifold and the first plank are joined by operations comprising:
mating a first feature of the first plank and a second feature of the first manifold to define a second weld line; and
friction-stir welding the mated first feature and second feature to form the second friction-stir welding joint along the second weld line.

28. The heat exchanger of claim 22 further comprising segmenting the first conduit into a first plurality of second channels, wherein the first conduit is segmented by a first plurality of fins that project from the first plank into the first conduit.

29. The heat exchanger of claim 22 further comprising:
forming a first panel comprising the first plank and a third plank, wherein the first panel is formed by operations comprising;
providing the third plank, wherein the third plank comprises a third plurality of first channels, and wherein the third plank consists of the first material; and
joining the third plank and the first plank by friction-stir welding;
forming a second panel comprising the second plank and a fourth plank, wherein the second panel is formed by operations comprising;
providing the fourth plank, wherein the fourth plank comprises a fourth plurality of first channels, and wherein the fourth plank consists of the first material; and
joining the fourth plank and the second plank by friction-stir welding, wherein the fourth plank and second plank collectively define a second panel; and
joining the first panel and second panel by friction-stir welding, wherein the joined first panel and second panel collectively define the first conduit.

* * * * *